United States Patent
Drewes et al.

(10) Patent No.: US 10,585,009 B2
(45) Date of Patent: Mar. 10, 2020

(54) PRESSURE MEASUREMENT CELL

(71) Applicant: Endress+Hauser GmbH+Co. KG, Maulburg (DE)

(72) Inventors: Ulfert Drewes, Müllheim (DE); Nils Ponath, Lörrach (DE); Andreas Rossberg, Bad Säckingen (DE); Elke Schmidt, Bad Säckingen (DE); Anh Tuan Tham, Berlin (DE)

(73) Assignee: Endress+Hauser SE+Co. KG, Maulberg (DE)

( * ) Notice: Subject to any disclaimer, the term of this patent is extended or adjusted under 35 U.S.C. 154(b) by 358 days.

(21) Appl. No.: 15/532,528

(22) PCT Filed: Nov. 3, 2015

(86) PCT No.: PCT/EP2015/075500
§ 371 (c)(1),
(2) Date: Jun. 2, 2017

(87) PCT Pub. No.: WO2016/087148
PCT Pub. Date: Jun. 9, 2016

(65) Prior Publication Data
US 2017/0343440 A1  Nov. 30, 2017

(30) Foreign Application Priority Data
Dec. 4, 2014  (DE) .................. 10 2014 117 911

(51) Int. Cl.
*G01L 9/00* (2006.01)
*G01L 19/14* (2006.01)

(52) U.S. Cl.
CPC .......... *G01L 9/0075* (2013.01); *G01L 9/0044* (2013.01); *G01L 19/145* (2013.01)

(58) Field of Classification Search
None
See application file for complete search history.

(56) References Cited

U.S. PATENT DOCUMENTS 8,915,142 B2 * 12/2014 Drewes ................. G01L 9/0042
228/121
9,835,510 B2 * 12/2017 Tham .................... B33Y 70/00
(Continued)

FOREIGN PATENT DOCUMENTS

DE  102009046844 A1  5/2011
DE  102010000915 A1  7/2011
(Continued)

OTHER PUBLICATIONS

Search Report for German Patent Application No. 10 2014 117 911.0, German Patent Office, dated Jun. 15, 2015, 5 pp.
(Continued)

*Primary Examiner* — Natalie Huls
*Assistant Examiner* — Jermaine L Jenkins
(74) *Attorney, Agent, or Firm* — Christopher R. Powers; PatServe

(57) ABSTRACT

A pressure measurement cell is disclosed including a base body, substantially cylindrical at least in sections, a measuring membrane joined to the base body in a pressure-tight manner along a perimeter joint to form a measurement chamber between the base body and the measuring membrane, and a joining material that joins the perimeter joint between the base body and the measuring membrane. The base body and/or the measuring membrane have/has a stepped recess into which the joining material is at least partially disposed, the stepped recess structured to yield a minimum distance between the base body and the measuring membrane.

19 Claims, 1 Drawing Sheet

(56) References Cited

U.S. PATENT DOCUMENTS

| | | | | |
|---|---|---|---|---|
| 9,944,512 B2* | 4/2018 | Collet | .................. | B81B 3/0051 |
| 9,958,350 B2* | 5/2018 | Ponath | .................. | G01L 9/0075 |
| 9,958,352 B2* | 5/2018 | Jacob | .................. | G01L 19/0618 |
| 10,330,549 B2* | 6/2019 | Ponath | ............... | B23K 35/0238 |
| 2007/0095147 A1 | 5/2007 | Kikuiri et al. | | |

FOREIGN PATENT DOCUMENTS

| | | |
|---|---|---|
| DE | 102011084457 A1 | 4/2013 |
| EP | 1010973 A1 | 6/2000 |
| EP | 1780525 A1 | 2/2007 |
| WO | 2011061006 A1 | 3/2011 |

OTHER PUBLICATIONS

Search Report for International Patent Application No. PCT/EP2015/075500, WIPO, dated Feb. 25, 2016, 12 pp.

* cited by examiner

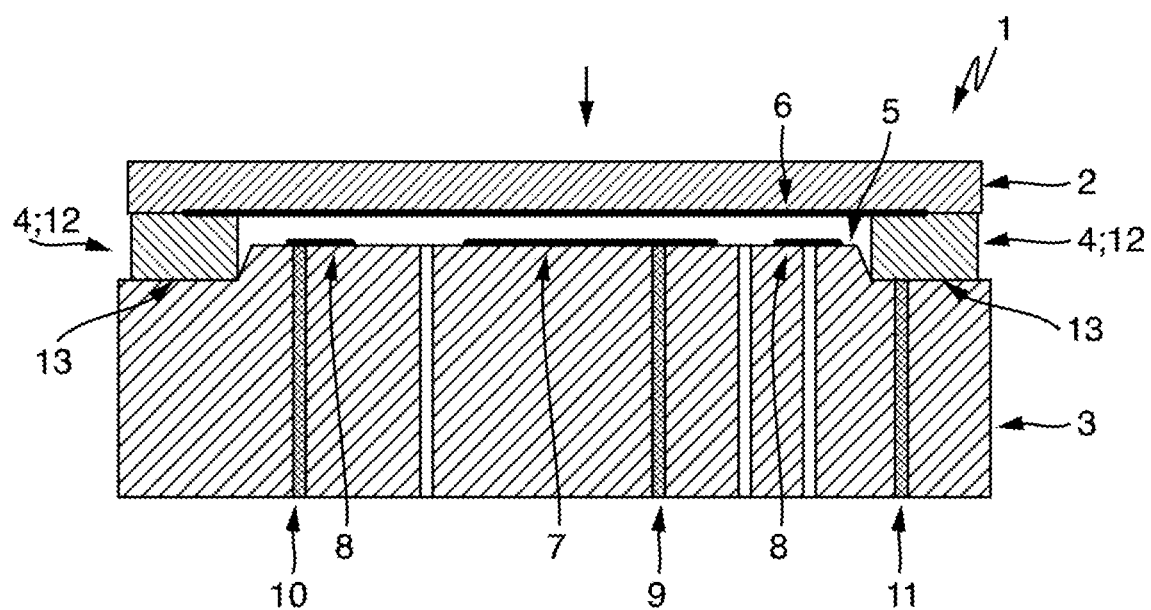

PRESSURE MEASUREMENT CELL

CROSS-REFERENCE TO RELATED APPLICATION

The present application is related to and claims the priority benefit of German Patent Application No. 10 2014 117 911.0, filed on Dec. 4, 2014 and International Patent Application No. PCT/EP2015/075500, filed on Nov. 3, 2015, the entire contents of which are incorporated herein by reference.

TECHNICAL FIELD

The present disclosure relates to a capacitive pressure measurement cell.

BACKGROUND

A conventional pressure measurement cell has a ceramic base body that is essentially cylindrical at least in sections, a ceramic measuring membrane and a capacitive transducer, wherein the measuring membrane is joined to the base body in a pressure-tight manner along a circumferential joint and a measurement chamber is formed between the measuring membrane and the base body, wherein the measuring membrane is deflectable from a resting position of the measuring membrane into a pressure-dependent position as a function of a difference between a first pressure on an outer side of the measuring membrane facing away from the measurement chamber and a second pressure in the measurement chamber, wherein the capacitive transducer has a membrane electrode facing the base body, and wherein the base body has at least one first base-body electrode facing the measuring membrane, wherein the capacitance between the at least one membrane electrode and the first base-body electrode is a function of the pressure-dependent position of the measuring membrane.

For joining the two bodies, meaning the base body and the measuring membrane, so-called active solders are used, which typically melt between 600 and 1000° C. and are usually processed at 800 to 1050° C. By using active solders, direct welding of ceramics without additional metallization is possible. These solders are metallic solders that can, because of their alloy composition, wet non-metallic, inorganic materials. They normally contain components, such as titanium, zirconium or hafnium, that react with ceramics. Such active solders in the form of metallic foils can be manufactured using a melt spinning method, wherein only a minimum thickness of about 25 micrometers is achievable due to technical constraints. Subsequent processing to reduce the thickness of the metallic foil, for example, using a rolling method, is not possible.

When using active solders of this sort, meaning metallic foils, for joining the base body and the measuring membrane, the distance between the base body and the measuring membrane, which together form the measurement chamber, is determined by the thickness of the active solder. From a manufacturing standpoint, however, such metallic foils, as already mentioned, cannot be manufactured thinner than about 25 micrometers. Accordingly, pressure measurement cells known from prior art have a distance between the base body and the measuring membrane of at least about 25 micrometers.

With regard to the measurement performance of the pressure measurement cell, however, it is advantageous to have a substantially smaller distance because the distance substantially influences two parameters of the pressure measurement cell. First, the maximum allowable overpressure or the maximum overload that can be applied to the outer side of the measuring membrane facing away from the pressure chamber without the measuring membrane being destroyed; and second, the resolution of the measurement signal which increases with a smaller distance, since the pressure measurement cell works in a range of larger capacitance.

In general, the measuring membrane is deflected out of its resting position when pressure is applied to the outer side of the measuring membrane facing away from the pressure chamber. The measuring membrane is deformed or deflected in the direction of the base body in this case and is partially pressed onto the base body as a result of a corresponding pressure. After removal of the pressure, the measuring membrane again returns to its resting position.

In the event that the maximum overload is exceeded, meaning the application of a pressure above the maximum allowable overpressure, the measuring membrane is deflected so far that such huge tensile stresses are caused on the outer side facing away from the measurement chamber that the measuring membrane is or can be destroyed. This damage can be avoided if a distance between measuring membrane and base body is selected at which the measuring membrane largely rests against the base body before such huge tensile stresses arise so that further mechanical deformation is not possible.

SUMMARY

The present disclosure is thus directed toward optimizing the measurement performance of a pressure measurement cell.

The goal is achieved according to the present disclosure by a pressure measurement cell that includes a base body essentially cylindrical at least in sections, a measuring membrane joined in a pressure-tight manner along a circumferential joint to form a measurement chamber between the base body and the measuring membrane, a joining means that serves to join the circumferential joint between the base body and the measuring membrane, where the base body and/or the measuring membrane has an essentially stepped recess, into which the joining means is at least partially inserted so that a minimum distance is produced between the base body and the measuring membrane.

"Minimum distance between base body and measuring membrane" refers to the smallest possible distance that allows as large a resolution of the measurement signal as possible.

According to the present disclosure, the distance between the measuring membrane and the base body is reduced by a stepped recess, into which the joining means is inserted. The joining means is thus at least partially inserted into the stepped recess depending upon its height.

An embodiment of the pressure measurement cell according to the present disclosure provides that the base body and/or the measuring membrane comprise(s) a ceramic material, in particular aluminum oxide.

A further embodiment of the pressure measurement cell according to the present disclosure provides that the joining means has an active solder foil. In particular, it is provided that the active solder foil comprises a zirconium-nickel-titanium alloy and/or has a thickness of at least 25 micrometers.

A further embodiment of the pressure measurement cell according to the present disclosure provides that the essentially stepped recess has a step height of at least 12 micrometers, or of at least 16 micrometers, or of at least 18 micrometers.

A further embodiment of the pressure measurement cell according to the present disclosure provides that the stepped recess has a step height of no more than 40 micrometers, or of no more than 30 micrometers, or of no more than 20 micrometers.

A further embodiment of the pressure measurement cell according to the present disclosure provides that the minimum distance is at least 5 micrometers, or at least 7 micrometers, or at least 9 micrometers.

A further embodiment of the pressure measurement cell according to the present disclosure provides that the minimum distance is no more than 15 micrometers, or no more than 13 micrometers, or no more than 12 micrometers.

A further embodiment of the pressure measurement cell according to the present disclosure includes a transducer that converts a pressure-dependent position of the measuring membrane into a pressure-dependent signal. In an embodiment, the transducer is a capacitive transducer that produces a pressure-dependent signal using a capacitance between a membrane electrode on the measuring membrane facing the base body and a measurement electrode on the base body facing the measuring membrane.

BRIEF DESCRIPTION OF THE DRAWING

The present disclosure is explained in more detail based upon the following drawing. Illustrated are:
FIG. 1 shows a longitudinal section of the pressure measurement cell according to the present disclosure.

DETAILED DESCRIPTION

FIG. 1 shows a longitudinal section of the pressure measurement cell 1 according to the present disclosure. Said cell comprises a circular, disc-shaped measuring membrane 2, which is joined in a pressure-tight manner to a significantly stiffer, circular, plate-shaped base body 3 along a joint 4 to form a measurement chamber 5 between base body 3 and measuring membrane 2. In embodiments, the measuring membrane 2 and the base body 3 are essentially formed from a ceramic material. Thus, for example, the base body 3 and/or the measuring membrane 2 can be made from aluminum oxide.

The base body 3 and the measuring membrane 2 are durably connected to one another via a joining method. For this purpose, the measuring membrane 2 is joined in a pressure-tight manner along a circumferential joint 4 to the base body 3 so that the measurement chamber 5 is created between the base body 3 and the measuring membrane 2. In doing so, a joining means 12 (i.e., joining material), such as a metallic active solder foil, is used for the joining. In such embodiments, the active solder foil has a zirconium-nickel-titanium alloy.

As shown in FIG. 1, the base body 3 comprises in its edge area a stepped recess 13 having a suitable step height. Naturally, the stepped recess 13 may be in the measuring membrane 2 or in both the measuring membrane 2 and the base body 3. The stepped recess 13 typically has a step height in the range of about 10 to 25 micrometers. The active solder foil is inserted into this stepped recess 13 before joining so that the base body 3 and the measuring membrane 2 are joined while forming the measurement chamber 5, wherein the active solder foil sits at least partially in the stepped recess.

In general, a minimum distance between the base body 3 and the measuring membrane 2 can be established by the selection of the step height in combination with the thickness of the active solder foil, which minimum distance optimizes the measurement performance of the pressure measurement cell 1 for a specific application. It should be remembered here that the selection of the minimum distance determines not only the maximum overload that can be applied to the outer side of the measuring membrane 2 but also the resolution of the measurement signal. If, for example, the minimum distance selected is smaller than the 25 micrometers known from prior art, the measuring membrane 2 will be deflected so far upon application of an overload or of an overpressure to the outer side of the measuring membrane 2 that it abuts against the base body 3. This abutment prevents excessive tensile stresses from occurring on the outer side of the measuring membrane 2 and the latter from being destroyed.

It has become clear that a minimum distance in the range of about 5 to 15 micrometers is suitable. Taking into consideration the largest possible overload that can be applied as well as an appropriate resolution of the measurement signal, a range of about 5 to 10 micrometers for the minimum distance has proven to be particularly advantageous.

The measuring membrane 2 has on its side facing the measurement chamber 5 an essentially full-surface membrane electrode 6, which, for example, comprises a metal layer that is created by sputtering or screen printing. The membrane electrode 6 extends at least partially to the inner edge of the joint 4 in order to electrically connect it to the base body 3 via the joining means 12. The base body 3, in turn, has an electrically conductive feedthrough 11, via which the additional point of electrical contact of the membrane electrode 6 to the back side of the base body 3 is enabled.

The base body 3 has, on its side facing the measurement chamber 5, at least one electrode, preferably however at least two electrodes. In the embodiment illustrated in FIG. 1, the base body 3 has two electrodes 7, 8, including a measurement electrode 7, which is arranged essentially centrally on the base body 3 and is typically formed as a circular surface, and a reference electrode 8, which typically is annular and encircles the measurement electrode 7. The reference electrode 8 and the measurement electrode 7 are in electrical contact via further electrically conductive feedthroughs 9, 10 through the base body 3 with the back side of the base body 3.

In this case, the measurement electrode 7 and the membrane electrode 6 form a capacitive unit, via which a capacitive transducer (not shown in FIG. 1) determines a pressure applied to the measuring membrane 2. The measuring membrane 2 and thus accordingly also the membrane electrode 6 are deformed or deflected by the pressure applied to the measuring membrane 2, which in turn leads to a capacitance change of the capacitive unit. The capacitance change is then converted by the capacitive transducer into an electrical, pressure-dependent signal, which represents the pressure value. Via reference electrode 8, which can also be part of the capacitive unit, influences on the pressure-dependent signal, such as temperature drift, etc., can be compensated for, which would otherwise be reflected in the pressure-dependent signal.

The invention claimed is:
1. A pressure measurement cell comprising:
a base body, substantially cylindrical, at least in sections;

a measuring membrane joined to the base body in a pressure-tight manner along a perimeter joint to form a measurement chamber between the base body and the measuring membrane; and a joining material that joins the perimeter joint between the base body and the measuring membrane, wherein the base body and/or the measuring membrane includes a stepped recess into which the joining material is at least partially disposed, the stepped recess structured to yield a minimum distance between the base body and the measuring membrane, wherein the stepped recess has a step height of at least 12 micrometers.

2. The pressure measurement cell of claim 1, wherein the base body and/or the measuring membrane comprise a ceramic material.

3. The pressure measurement cell of claim 2, wherein the ceramic material is aluminum oxide.

4. The pressure measurement cell of claim 1, wherein the joining material comprises an active solder foil.

5. The pressure measurement cell of claim 4, wherein the active solder foil comprises a zirconium-nickel-titanium alloy.

6. The pressure measurement cell of claim 4, wherein the active solder foil has a thickness of at least 25 micrometers.

7. The pressure measurement cell of claim 1, wherein the stepped recess has a step height of at least 16 micrometers.

8. The pressure measurement cell of claim 1, wherein the stepped recess has a step height of at least 18 micrometers.

9. The pressure measurement cell of claim 1, wherein the stepped recess has a step height of no more than 40 micrometers.

10. The pressure measurement cell of claim 1, wherein the stepped recess has a step height of no more than 30 micrometers.

11. The pressure measurement cell of claim 1, wherein the stepped recess has a step height of no more than 20 micrometers.

12. The pressure measurement cell of claim 1, wherein the minimum distance is at least 5 micrometers.

13. The pressure measurement cell of claim 1, wherein the minimum distance is at least 7 micrometers.

14. The pressure measurement cell of claim 1, wherein the minimum distance is at least 9 micrometers.

15. The pressure measurement cell of claim 1, wherein the minimum distance is no more than 15 micrometers.

16. The pressure measurement cell of claim 1, wherein the minimum distance is no more than 13 micrometers.

17. The pressure measurement cell of claim 1, wherein the minimum distance is no more than 12 micrometers.

18. The pressure measurement cell of claim 1, the pressure measurement cell further comprising a transducer structured to convert a pressure-dependent position of the measuring membrane into a pressure-dependent signal.

19. The pressure measurement cell of claim 18, wherein the transducer is a capacitive transducer that generates the pressure-dependent signal using a capacitance between a membrane electrode on the measuring membrane facing the base body and a measurement electrode on the base body facing the measuring membrane.

* * * * *